(12) United States Patent
Aarre

(10) Patent No.: US 10,795,040 B2
(45) Date of Patent: Oct. 6, 2020

(54) THIN BED TUNING FREQUENCY AND THICKNESS ESTIMATION

(71) Applicant: Schlumberger Technology Corporation, Sugar Land, TX (US)

(72) Inventor: Victor Aarre, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 251 days.

(21) Appl. No.: 15/566,217

(22) PCT Filed: Apr. 13, 2016

(86) PCT No.: PCT/US2016/027381
§ 371 (c)(1),
(2) Date: Oct. 13, 2017

(87) PCT Pub. No.: WO2016/168373
PCT Pub. Date: Oct. 20, 2016

(65) Prior Publication Data
US 2018/0088249 A1    Mar. 29, 2018

Related U.S. Application Data

(60) Provisional application No. 62/148,819, filed on Apr. 17, 2015.

(51) Int. Cl.
*G01V 1/30*  (2006.01)
*G01V 1/32*  (2006.01)

(52) U.S. Cl.
CPC ............... *G01V 1/301* (2013.01); *G01V 1/30* (2013.01); *G01V 1/307* (2013.01); *G01V 1/325* (2013.01);
(Continued)

(58) Field of Classification Search
CPC ............... G01V 1/301; G01V 2210/43; G01V 2210/63; G01V 1/307; G01V 1/30; G01V 1/325; G01V 2210/21; G01V 2210/64
See application file for complete search history.

(56) References Cited

U.S. PATENT DOCUMENTS 5,870,691 A    2/1999    Partyka et al.
6,131,071 A    10/2000   Partyka et al.
(Continued)

FOREIGN PATENT DOCUMENTS

CN    101545983 A    9/2009

OTHER PUBLICATIONS

Castagna, et al., "Comparison of spectral decomposition methods," first break, vol. 24, Mar. 2006, pp. 75-79.
(Continued)

*Primary Examiner* — Ian J Lobo

(57) ABSTRACT

A method, apparatus, and program product analyze time-series data such as seismic data collected from a subsurface formation by splitting a time-series data set such as an individual seismic trace into a plurality of spectral components, each having an associated frequency, determining an instantaneous frequency for each spectral component, determining a frequency difference for each spectral component based at least in part on the associated and instantaneous frequencies therefor, and determining a tuning parameter based at least in part on the determined frequency difference of each spectral component. Doing so enables, for example, thin-bed structures in the subsurface formation to be identified, and in some instances, thicknesses of such structures to be determined.

20 Claims, 11 Drawing Sheets

(52) U.S. Cl.
CPC ...... *G01V 2210/21* (2013.01); *G01V 2210/43* (2013.01); *G01V 2210/63* (2013.01); *G01V 2210/64* (2013.01)

(56) References Cited

U.S. PATENT DOCUMENTS

| | | | |
|---|---|---|---|
| 6,965,830 B1 * | 11/2005 | Bahorich | G01V 1/28 702/14 |
| 7,525,873 B1 | 4/2009 | Bush et al. | |
| 2013/0083626 A1 | 4/2013 | Sheffield et al. | |
| 2013/0135967 A1 | 5/2013 | Victoria | |
| 2014/0297188 A1 | 10/2014 | Zoukaneri et al. | |

OTHER PUBLICATIONS

Davogustto, et al., "Resolving subtle stratigraphic features using spectral ridges and phase residues," SEG Interpretation / Aug. 2013, downloaded Aug. 23, 2013 at http://library.seg.org/, pp. SA93-SA108.

Marfurt, et al., "Narrow-band spectral analysis and thin-bed tuning," Geophysics vol. 66, No. 4, Jul.-Aug. 2001, pp. 1274-1283.

Partyka, et al., "Interpretational applications of spectral decomposition in reservoir characterization," The Leading Edge, Mar. 1999, pp. 353-360.

International Search Report and Written Opinion for the equivalent International patent application PCT/US2016/027381 dated Jul. 21, 2016.

International Preliminary Report on Patentability for PCT/US2016/027381 dated Oct. 26, 2017.

Chopra, et al., "Emerging and future trends in seismic attributes," The Leading Edge, Society of Exploration, Geophysicists, US, vol. 27, No. 3, Mar. 1, 2008, pp. 298-300.

Deemer, et al., "Post-rift flood-basalt-like volcanism on the Newfoundland Basin nonvolcanic margin: The U event mapped with spectral decomposition," Tectonophysics, Elsevier, Amsterdam, NL, vol. 494, No. 1-2, Oct. 29, 2010, pp. 1-16.

Stark, "Instantaneous frequency spectra," The Leading Edge, vol. 34, No. 1, Jan. 1, 2015, pp. 72-78, p. 72, col. 2.

Sun, et al., "Relative peak frequency increment method for quantitative thin-layer thickness estimation," Journal of Earth Science, China University of Geosciences, Heidelberg, vol. 24, No. 6, Dec. 12, 2013, pp. 1068-1078.

Extended Search Report for the European patent application 16780684.3 dated Nov. 13, 2018.

* cited by examiner

450

460

470

480

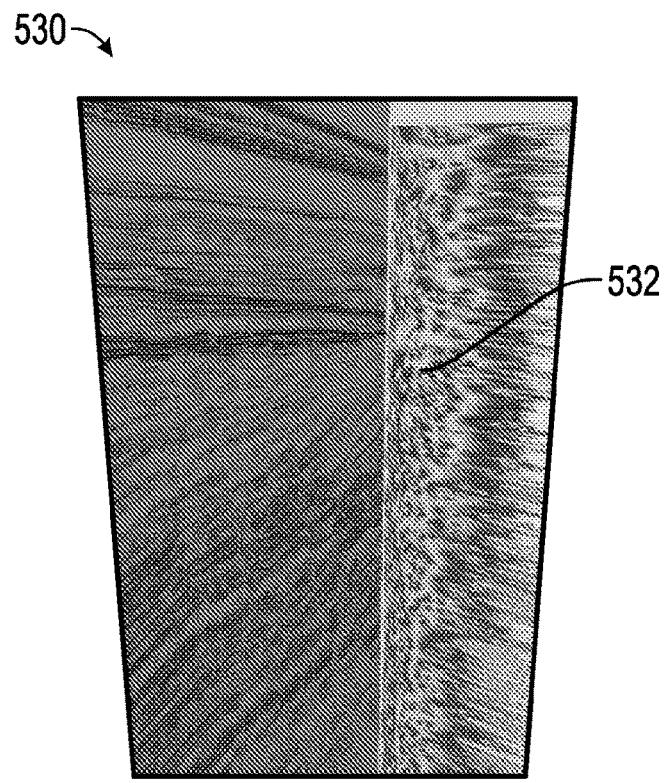
FIG. 15
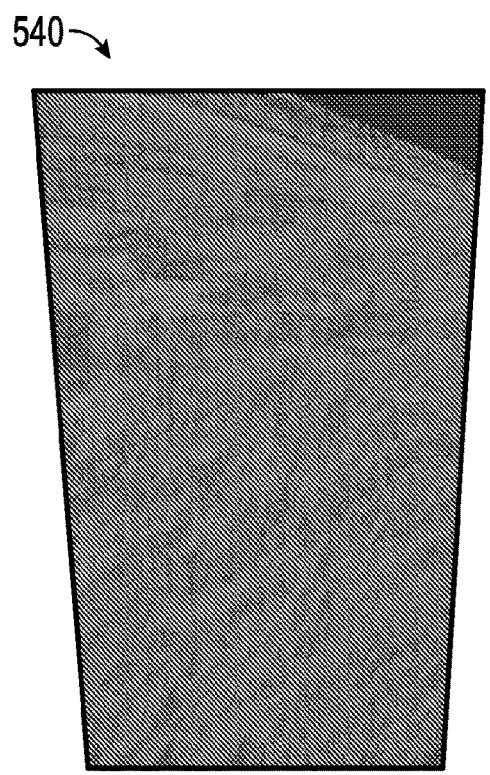 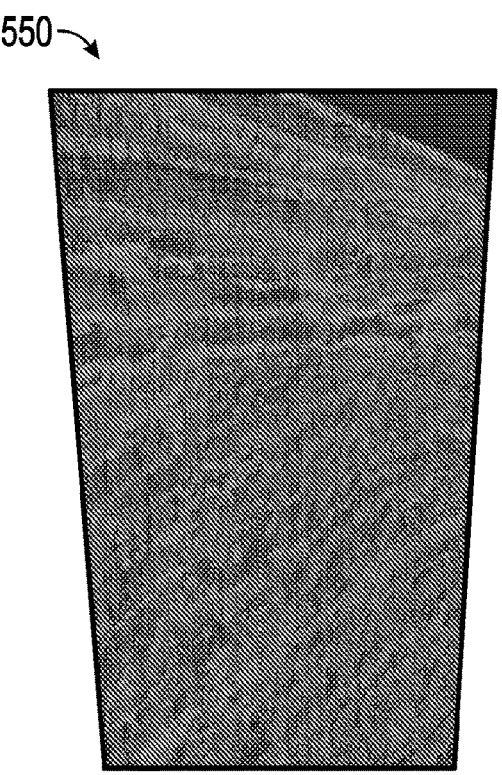
FIG. 16    FIG. 17

THIN BED TUNING FREQUENCY AND THICKNESS ESTIMATION

CROSS-REFERENCE TO RELATED APPLICATIONS

This application claims the filing benefit of U.S. Provisional Patent Application Ser. No. 62/148,819 filed on Apr. 17, 2015, which is incorporated by reference herein in its entirety.

BACKGROUND

Generally, in oil and gas reservoir exploration and development, the identification/detection of thin-bed structures in subsurface formations is of commercial interest because thin beds can indicate the locations of potentially-recoverable hydrocarbons in a hydrocarbon reservoir. A thin bed in many cases is a formation comprising a sand body embedded in a shale host rock, and which is generally thinner than the resolution of a logging tool used to characterize it.

Computer based systems and methods are increasingly being used to aid exploration and development of oil and gas reservoirs. Therefore, a need continues to exist in the art for improved computer based systems and methods for oil and gas reservoir exploration and development, particularly for use in connection with the identification/detection of thin beds in subsurface formations.

SUMMARY

In accordance with some embodiments, time-series data such as seismic data is analyzed by splitting a time-series data set such as an individual seismic trace into multiple spectral components, each having an associated frequency, determining an instantaneous frequency for each spectral component, determining a frequency difference for each spectral component based at least in part on the associated and instantaneous frequencies therefor, and determining a tuning parameter based at least in part on the determined frequency difference of each spectral component. Doing so enables, in some embodiments, thin-bed structures in a subsurface formation to be identified, and in some instances, thicknesses of such structures to be determined.

In some embodiments, the time-series data set includes an individual seismic trace in a seismic data set obtained from a subsurface formation, splitting the time-series data set into spectral components includes splitting the individual seismic trace into the spectral components, and determining the tuning parameter based at least in part on the determined frequency difference of each spectral component includes determining the tuning parameter for the individual seismic trace.

In addition, in some embodiments, the individual seismic trace is among a plurality of individual seismic traces in the seismic data set obtained from the subsurface formation, and the analysis further includes splitting each of the individual seismic traces into multiple spectral components, each having an associated frequency, determining an instantaneous frequency for each spectral component for each of the individual seismic traces, determining a frequency difference for each spectral component for each of the individual seismic traces based at least in part on the associated and instantaneous frequencies therefor, and determining tuning parameters for the seismic data set based at least in part on the determined frequency difference of each spectral component for each of the individual seismic traces.

In some embodiments, the tuning parameter is tuning frequency or tuning thickness, and some embodiments include determining a maximum frequency difference spectral component for each of a plurality of samples of the individual seismic trace. In addition, in some embodiments, determining the tuning parameter includes, for each sample, determining a tuning frequency as the associated frequency for the maximum frequency difference spectral component determined for that sample. Some embodiments also include determining a minimum limit frequency and/or a maximum limit frequency for the individual seismic trace based at least in part on the frequency difference of each spectral component for the individual seismic trace, and in some embodiments, determining the maximum frequency difference spectral component for each sample of the individual seismic trace includes filtering out spectral components having associated frequencies outside of the determined minimum limit frequency and/or maximum limit frequency. In some embodiments, the determined minimum limit frequency and/or maximum limit frequency includes a static limit frequency, while in some embodiments, the determined minimum limit frequency and/or maximum limit frequency includes a time or depth-varying limit frequency.

In addition, some embodiments include determining a tuning thickness for each sample from the determined tuning frequency therefor, and in some embodiments, the determined tuning thickness represents a thickness of a thin-bed structure in the subsurface formation. In addition some embodiments include performing an oilfield operation using the determined tuning parameter.

Further, in some embodiments, splitting the time-series data set into the spectral components includes applying a narrowband filter having the associated frequency for each of the spectral components to the time-series data set, and in some embodiments the narrowband filter includes a short-time Fourier transform, a Stockwell transform, or a Continuous Wavelet Transform (CWT) filter. In some embodiments, determining the instantaneous frequency for each spectral component includes determining a derivative of the instantaneous phase for each spectral component, and in some embodiments, determining the frequency difference for each spectral component based at least in part on the associated and instantaneous frequencies therefor includes normalizing the determined frequency difference.

Some embodiments also include an apparatus including at least one processor, a memory, and program code stored on the memory and configured upon execution by the at least one processor to perform any of the aforementioned operations, as well as a program product including a non-transitory computer readable medium and program code stored on the non-transitory computer readable medium and configured upon execution by at least one processor to perform any of the aforementioned operations.

Some embodiments also include a method, apparatus or program product that receive seismic data including one or more individual traces, split each individual trace into multiple spectral components, for each individual trace, determine an instantaneous frequency for each spectral component, for each spectral component of each individual trace, determine a frequency difference for the spectral component based on an associated frequency of the spectral component and the determined instantaneous frequency for the spectral component, and determine a tuning frequency for the seismic data based at least in part on the determined frequency difference for each spectral component.

These and other advantages and features are set forth in the claims annexed hereto and forming a further part hereof.

However, for a better understanding of subject matter described herein, and of the advantages and objectives attained through its use, reference should be made to the Drawings, and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate various embodiments, and, together with a general description given above and the detailed description of some embodiments given below, serve to explain some embodiments.

FIGS. 7-20 illustrate various graphical representations of example seismic data processed by the data processing system of FIG. 1 and in accordance with implementation of various technologies and techniques described herein.

DETAILED DESCRIPTION

The herein-described embodiments analyze time-series data by splitting a time-series data set into a plurality of spectral components, each having an associated frequency, determining an instantaneous frequency for each spectral component, determining a frequency difference for each spectral component based at least in part on the associated and instantaneous frequencies therefor, and determining a tuning parameter based at least in part on the determined frequency difference of each spectral component.

A time-series data set, in this regard, may refer to various types of data samples collected over a time period, and the techniques described herein may be used, for example, to account for tuning effects resulting from closely spaced events in a time-series data set that result in interference that inhibits distinguishing the closely spaced events from one another. In the illustrated embodiments, for example, the time-series data sets are individual seismic traces collected for a subsurface formation, where tuning effects can inhibit the identification/detection of thin-bed structures represented by closely-spaced reflection wavelets in the seismic traces. It will be appreciated, however, that the invention is not limited to use with analyzing seismic data, and as such, the principles of the invention may apply to other types of data and/or applications.

Other variations and modifications will be apparent to one of ordinary skill in the art.

Hardware and Software Environment

Figure 1:
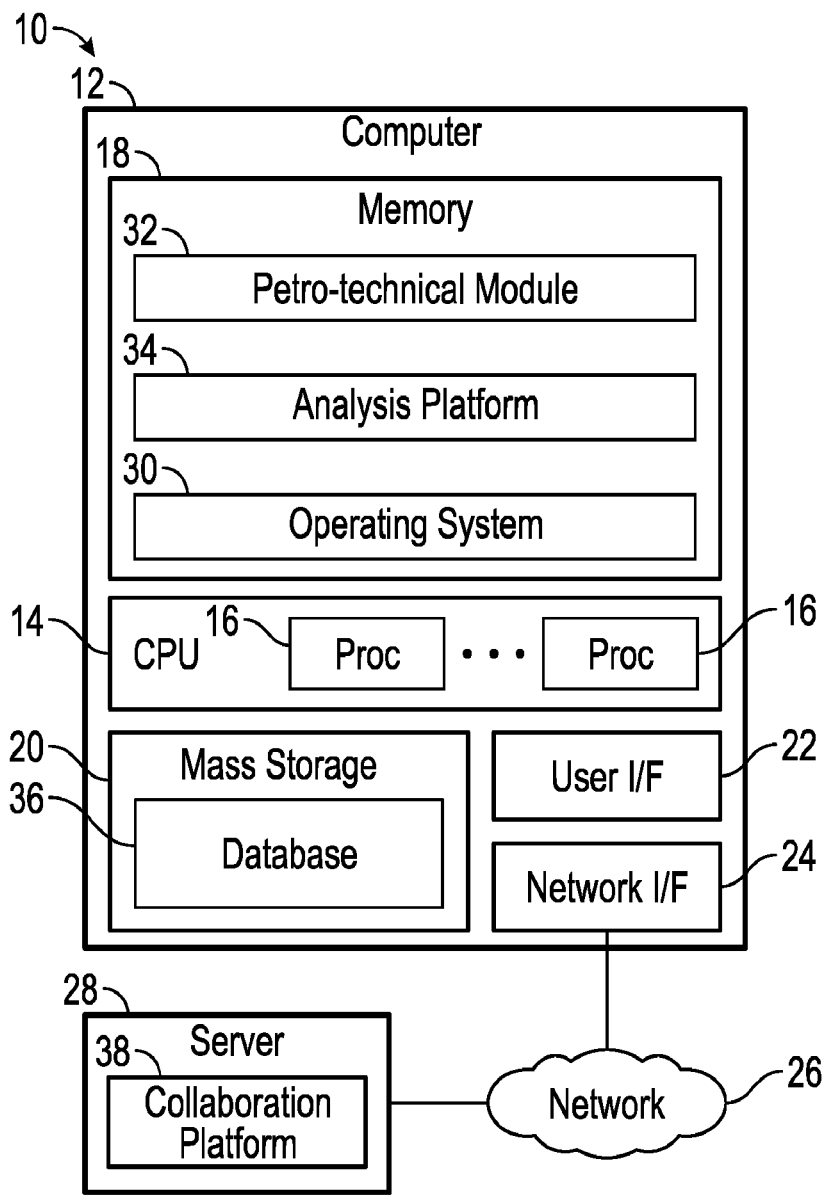
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc. Additionally, a computer 12 may be in communication with one or more data acquisition tools, sensors, surface production network components, and/or other such devices that may be implemented in connection with performing oilfield operations such as oil and gas recovery and/or exploration operations.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12. It will be appreciated that in some embodiments, the functionality of one or more computers 12 and/or one or more servers 28 may be implemented within a cloud computing environment whereby petro-technical data may be stored and/or processed remotely from an end user.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so embodiments are not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the description applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment. However, it should be appreciated that any particular program nomenclature that follows is used merely for convenience, and thus embodiments should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that embodiments are not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, embodiments are not limited to the particular sequences of operations described herein.

Those skilled in the art will recognize that the example environment illustrated in FIG. 1 is not intended to be limiting. Indeed, those skilled in the art will recognize that other alternative hardware and/or software environments may be used without departing from the subject matter disclosed herein.

Oilfield Operations

Figure 2A:
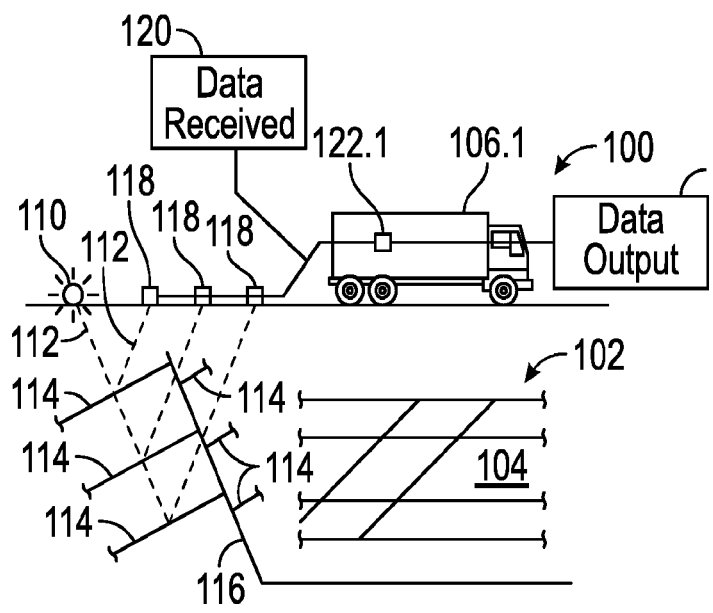
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
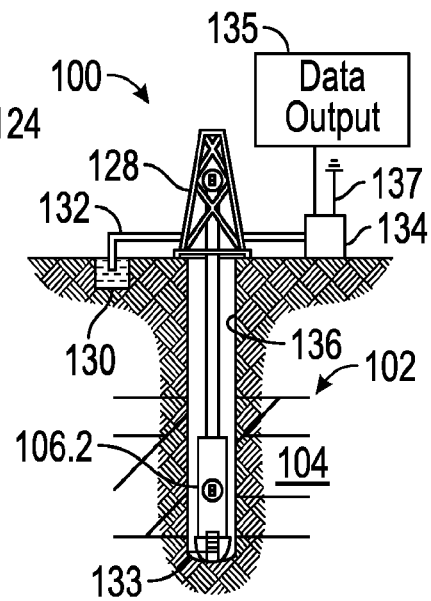

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing by the data processing system 10 and/or other such systems. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
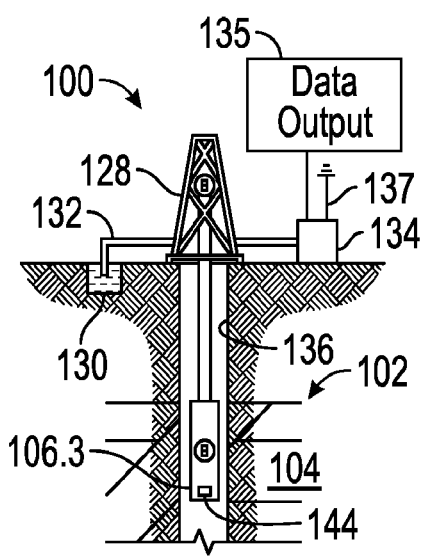

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102. Wireline tool 106.3 may be configured to collect measurement data for one or more pretests consistent with some embodiments.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition, pressure, and/or other parameters of the field operation, well/wellbore, and/or reservoir.

Figure 2D:
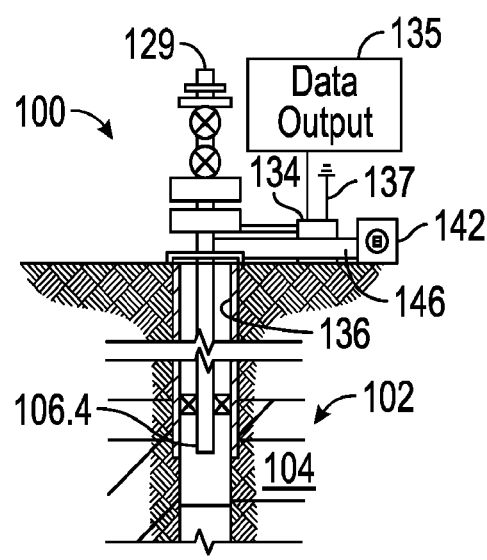

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
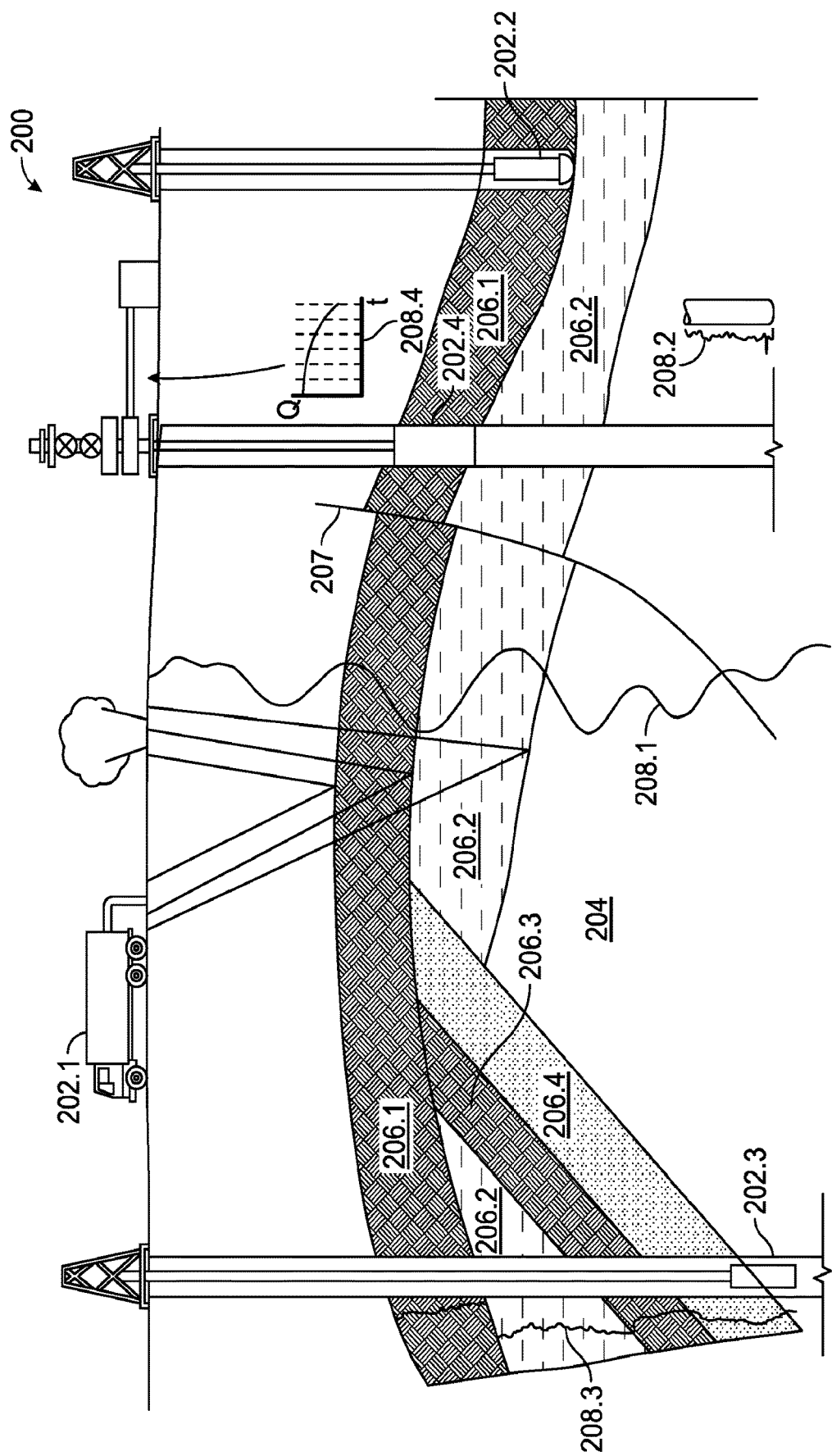
FIG. 3 illustrates a schematic view, partially in cross section, of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations. As will be appreciated, data acquisition tools 202.1-202.4 may collect measurement data for analysis consistent with embodiments discussed herein.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
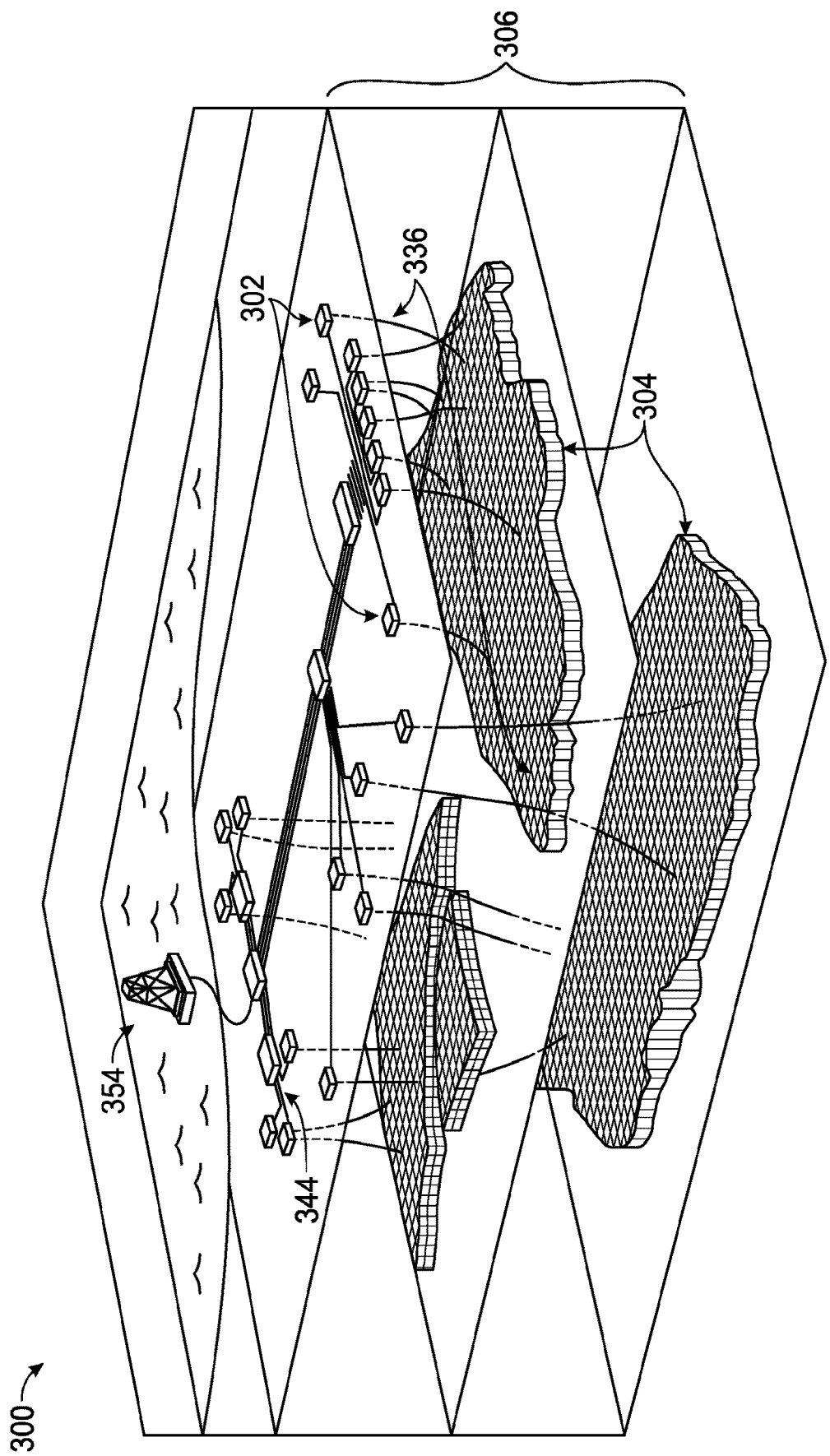
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Thin-Bed Tuning Frequency and Thickness Estimation

Tuning effects resulting from thin-bed structures in a subsurface formation can lead to difficulties in resolving individual reflections in seismic data. Seismic data may, for example, correspond to one-dimensional seismic data, two-dimensional seismic data, and/or three-dimensional seismic data, and may be represented, for example, as seismic volumes, seismic cubes, etc.

In seismic interpretation, numerous individual seismic traces are collected from a subsurface formation by monitoring one or more locations with geophones and recording the echoes that are generated in response to explosions or other seismic sources that generate what is referred to as a source wavelet that is propagated as sound energy through a subsurface formation. Seismic reflections occur when the source wavelet passes through differing types of rock, and as such, amplitude spikes (referred to as reflection wavelets) in a seismic trace generally represent the locations, in time, of the interfaces between different layers of rock.

Based upon the velocity of the sound energy traveling through the subsurface formation, the times of these reflection wavelets can then be converted to a depth below the surface, and through gathering seismic traces representing an entire area or volume subsurface formation, an estimate of the placement and extents of different layers and/or faults distributed throughout the subsurface formation may be obtained. Such information may then in turn be used for various purposes, e.g., to locate potential locations of recoverable hydrocarbons and thus potential drilling sites, among others.

Thin-bed structures may generally be considered to be structures in a subsurface formation that have a thickness in the vertical direction that causes the wavelets or reflections representing the upper and lower boundaries of such structures to at least partially overlap, resulting in either constructive or destructive interference that effectively inhibits distinguishing the individual wavelets from one another. For example, constructive interference, in which two reflection wavelets are effectively summed to amplify the combined seismic response, will generally be maximized between two wavelets with opposite polarities when the distance between the two wavelets is equal to half the wavelength of the seismic signal, i.e., when thickness=(0.5+n)/f, where n={0, 1, 2, . . . } is the order of the harmonics, and f is the frequency of the seismic signal. Conversely, destructive interference, in which two reflection wavelets effectively cancel one another out to suppress the combined seismic response, will generally result in maximum suppression, and minimum seismic response, when the distance between the two wavelets is equal to the wavelength of the seismic signal, i.e., when thickness=n/f.

A seismic wavelet is, according to the Fourier theorem, the sum of a number of individual frequencies, where each frequency has its own amplitude and phase. As such, when a seismic wavelet is reflected from two neighboring reflectors (e.g., as is the case with the top and bottom boundaries of a thin bed), the amplitude spectrum of the reflected wavelet will generally be different from the spectrum of the original wavelet because each frequency in the wavelet will have a changed amplitude, at least in part due to the interference between the wavelets, i.e., the two wavelets effectively act as a filter.

By examining the spectrum of a reflected wavelet it is generally possible, at least in some cases, to infer the presence and thickness of thin beds in a subsurface formation. These thin beds are of great commercial interest for the energy industry due to the fact that thin beds are in many cases sand bodies embedded in a shale host rock, and due to the fact that a sand body is often porous and permeable, thin beds are generally considered to be excellent candidates for hydrocarbon deposits. Shale rocks are generally not permeable (unless the rock is fractured), and thus in many cases can form reservoir cap (and source) rocks that keep hydrocarbons in place in embedded sand bodies.

Conventional approaches have applied various spectral decomposition techniques to identify/detect thin-bed structures in a subsurface formation. However, such conventional approaches have generally attempted to infer the presence of thin beds through studies of the amplitude spectrum of a reflected waveform. Doing so, however, generally presents a challenge because the amplitudes of the individual frequencies in a source wavelet are generally not equal (i.e. the amplitude spectrum of the source wavelet is not "white" or "flat"). As a result, spectral balancing generally is performed on the reflected seismic waveform before the tuning analysis can be performed. Spectral balancing is generally a complicated operation, particularly when no wells are available in a subsurface formation to perform joint log/seismic wavelet estimation. Generally with such approaches, blind/statistical methods are generally used for spectral balancing, which can be inaccurate, time consuming, and/or unreliable.

Consistent with some embodiments of the invention, however, a phase spectrum of seismic data may be used to determine a tuning parameter from which the presence and/or thickness of a thin-bed structure in a subsurface formation may be determined, and as such, spectral balancing is generally not utilized in at least some embodiments of the invention, i.e., a tuning parameter may be determined without the use of spectral balancing. A tuning parameter, in this regard, may in some embodiments refer to a tuning frequency or tuning thickness, or other parameter indicative of the presence, location and/or thickness of a thin-bed structure, although a tuning parameter may also refer to other tuning-related parameters in other applications (e.g., in non-seismic applications). Tuning frequency and tuning thickness are generally related, as will become more apparent below, by the equation T=1/Ft, where T is tuning thickness and Ft is tuning frequency. Tuning frequency, for example, may generally be inferred from destructive interference, such that a most likely cause for destructive interference is a thin bed with equal, but opposite polarity, reflectors, and given that the suppressive impact of destructive interference is maximized when the distance between two reflective wavelets is equal to the wavelength of the seismic signal, tuning thickness is generally the reciprocal of the tuning frequency.

The phase spectrum may be used in part by determining an instantaneous frequency for each of a plurality of spectral components of a seismic signal and determining frequency differences between the instantaneous frequencies and the associated frequencies for the respective spectral components. It will be appreciated that instantaneous frequency may be considered to be the derivative of instantaneous phase, and as such may be un-correlated to a seismic amplitude of a spectral component. Furthermore, in the presence of destructive interference, one or more spectral components of a seismic signal will generally be attenuated, resulting in an undefined phase that shifts the instantaneous frequencies of those spectral components away from the associated frequencies thereof. Consequently, the magnitude of the frequency differences in the spectral components of a seismic signal may be indicative of tuning effects, and thus the presence of potential thin-bed structures. As such, by identifying maximum frequency differences in the spectral components of various samples of a seismic trace, the presence, locations and/or thickness of thin-bed structures (e.g., in terms of tuning frequency or tuning thickness) may be identified.

As will become more apparent below, the techniques described herein are not limited to determining a tuning parameter for seismic data, and as such, may be used for determining various tuning parameters for other types of data and/or applications. For example, it will be appreciated that a seismic trace is a type of time-series data set where samples are taken at multiple time intervals, and as such, the techniques described herein may be applied to different types of time-series data sets, including various types of time-series data sets generated by various well logging tools, ultrasonic data sets, radar data sets, audio data sets, x-ray data sets, etc. where constructive and/or destructive interference may complicate the detection of closely-spaced events in a data set. Furthermore, it will be appreciated that the techniques disclosed herein are not limited to oil and gas applications, and may be used in other applications or industries, e.g., to detect/identify coal seams from seismic data, detect/identify blood vessels or other internal body parts, etc.

Figure 5:
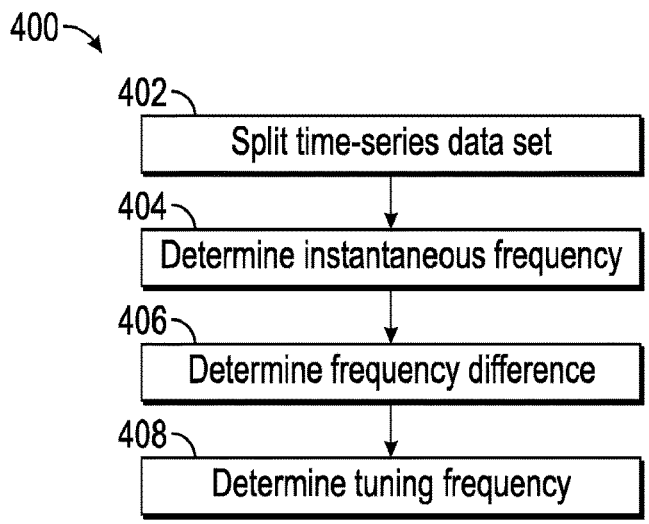
FIG. 5 provides a flowchart that illustrates a sequence of operations that may be performed by the data processing system of FIG. 1 to determine a tuning frequency in accordance with implementation of various technologies and techniques described herein.

As such, in some embodiments of the invention, and as illustrated by sequence of operations 400 of FIG. 5, a time-series data set, e.g., a seismic trace, may be analyzed by splitting the time-series data set into a plurality of spectral components each having an associated frequency (block 402), determining an instantaneous frequency for each spectral component (block 404), determining a frequency difference for each spectral component based at least in part on the associated and instantaneous frequencies therefor (block 406), and determining a tuning parameter based at least in part on the determined frequency difference of each spectral component (block 408). Sequence of operations 400 may be implemented, for example, within data processing system 10 of FIG. 1, e.g., as program code stored in a memory and executed by one or more processors.

Figure 6:
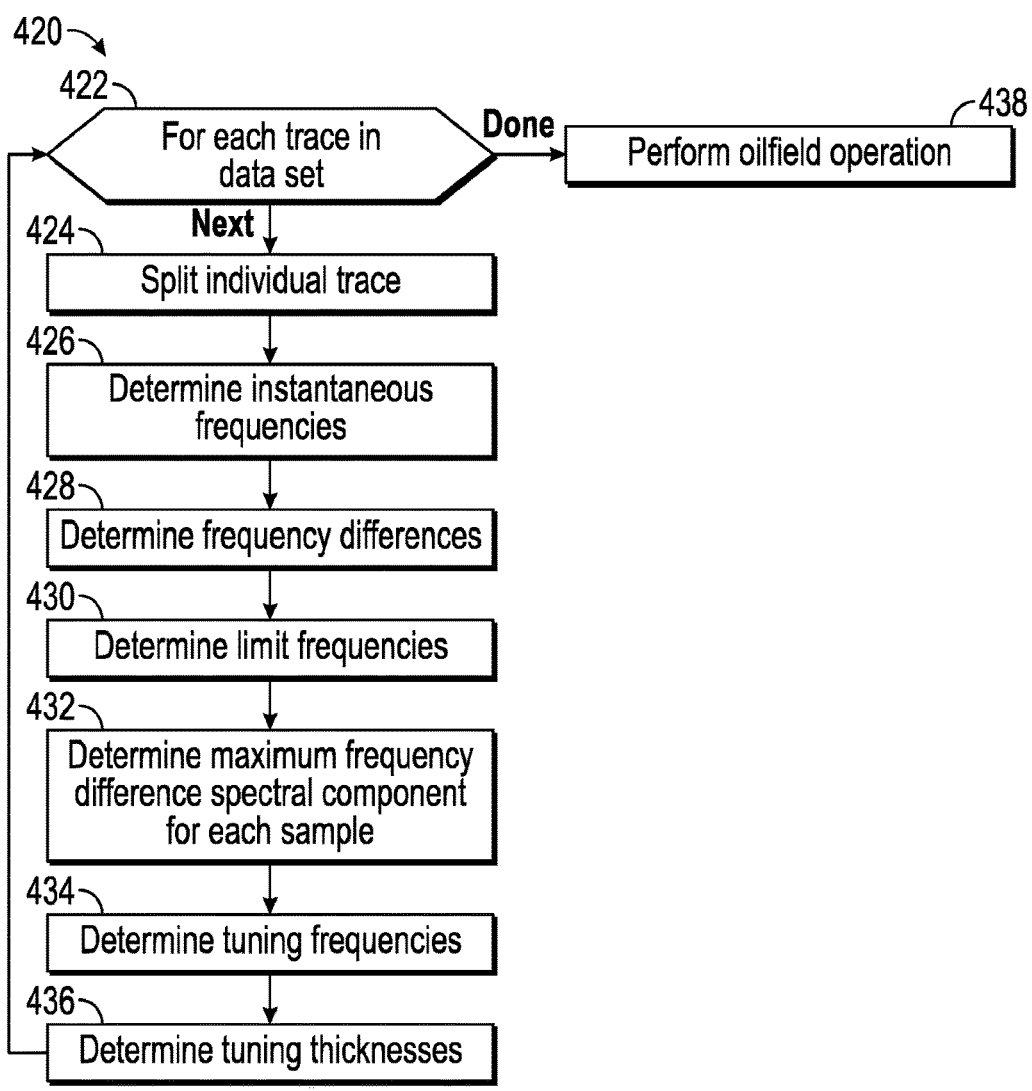
FIG. 6 provides a flowchart that illustrates a sequence of operations that may be performed by the data processing system of FIG. 1 to perform an oilfield operation in accordance with implementation of various technologies and techniques described herein.

FIG. 6 illustrates in more detail an implementation of sequence of operations 400 within the context of detecting/identifying thin-bed structures in a subsurface volume by analyzing a seismic data set, e.g., as may be collected for the subsurface volume over the course of one or more seismic surveys. It will be appreciated that the seismic data set may, in some embodiments, include individual seismic traces arranged into two-dimensional or three-dimensional data structures representative of slices or volumes within a subsurface formation.

Specifically, FIG. 6 illustrates a sequence of operations 420 that may be executed by one or more processors of data processing system 10 to analyze a plurality of individual seismic traces in a seismic data set to identify, locate and determine the thickness of one or more thin-bed structures in a subsurface formation. Sequence of operations 420 begins in block 422 by initiating a FOR loop to process each individual trace in the data set. For each such trace, control passes to block 424 to split the individual trace into a set of individual spectral components, each having a respective frequency F that is also referred to herein as an associated frequency. Splitting the trace may be performed, for example, by applying a narrowband filter to the trace to form a plurality of (e.g., N) spectral components for the trace. For example, for seismic data, it may be desirable to generate 125 spectral components representing 1 Hz bands in the range of 1-125 Hz. The desired number may be dependent on a sample rate (which determines the maximum frequency, called Nyquist frequency) and/or a number of samples in the trace (which may determine the number of spectral components which are required to fully represent the input trace). In other applications and/or types of data, other numbers of spectral components and/or other frequency ranges may be used. Various types of narrowband filters may be used to generate the spectral components, e.g., short-time Fourier transform, S(tockwell)-transform, Continuous Wavelet Transform, or any other appropriate type of frequency filter. It may be desirable for a filter to attempt to isolate each frequency to reduce spectral leakage between the spectral components (i.e., such that each spectral component is reasonably linearly independent). Furthermore, other spectral decomposition operations may be used to generate the spectral components in other embodiments.

Next, in block 426, an instantaneous frequency Fi is determined for each spectral component, where as noted above instantaneous frequency is generally considered the derivative of instantaneous phase. As also noted above, in the absence of destructive interference, the instantaneous frequency of a spectral component is anticipated to equal the associated frequency for that spectral component. As such, block 428 next determines a frequency difference Di between Fi and F for each spectral component for use as an indicator measure of destructive interference.

In some embodiments, instantaneous frequency is determined using the equation: $(1/360)*d\varphi/dt$(instantaneous phase), where the unit is Hz (i.e. oscillations per second). The instantaneous phase may be determined in a number of manners, e.g., by applying windowed cosine and sine filters and correlating the results. In addition, in some embodiments it may be desirable to unwrap a wrapped phase prior to calculating instantaneous frequency from instantaneous phase, e.g., using the equation:

$$\varphi(nT)=\varphi(((n\ 1)T)=\arg(s_a(nT)s_a((n\ 1)T)),$$

where the asterisk denotes complex conjugate. In addition, when determining the frequency difference, it may be desirable to normalize the difference, e.g., by calculating the difference using this equation: $(Fi-F)/F$.

Next, as illustrated in block 430, it may be desirable in some embodiments to determine one or both of limit frequencies Fmin and Fmax from Di for each spectral component. Further, in some embodiments, it may be desirable to estimate the limits by a smoothly time-varying function such as sloped line or other higher ordered functions. This is because in many embodiments Di may be highly chaotic for the lowest and highest frequencies that are outside of the bandwidth of the source seismic wavelet. In some embodiments, a measure of chaos in Di may accordingly be used to establish where the frequencies start to become reliable, and hence determine the limits of the useful frequency spectrum for the input seismic data. The determination of these limits may be performed manually, e.g., based upon a visualization such as described below, or may be performed programmatically, e.g., through image processing or other data analysis techniques. In other embodiments, however, no limits may be used.

Next, in block 432, a maximum frequency difference spectral component is determined for each sample in the individual trace, i.e., the spectral component where the value of Di is a maximum for a sample. The associated frequency F for that spectral component may then be used as the tuning frequency Ft for the sample, and as such block 434 may determine the tuning frequencies Ft for the samples in the individual trace based upon the maximum values determined in block 432. Furthermore, in embodiments where limit frequencies Fmin and Fmax are determined in block 430, the search for the maximum frequency difference spectral components may be constrained by those limits to exclude spectral components falling outside of the limited range.

Next, in block 436, a tuning thickness T may optionally be determined from the tuning frequency Ft for each sample in the input trace, e.g., using the equation: $T=1/Ft$. Control then returns to block 422 to process additional seismic traces in the data set. Once all traces have been processed, block 422 then passes control to block 438 to perform one or more oilfield operations using the tuning frequencies and/or tuning thicknesses determined in sequence of operations 420. For example, oilfield operations that may be performed in some embodiments include operations such as generating a model of a subsurface formation, running a simulation on a model of the subsurface formation, identifying one or more pay zones in the subsurface formation, developing a well plan, drilling a well according to a developed well plan, etc.

It will be appreciated that an oilfield operation in some embodiments may be performed using a different data processing system than data processing system 10 and/or using one or more operations that are not computer-implemented. Furthermore, it will be appreciated that particularly due to removing the dependency on spectral balancing, as is the case in some embodiments, the herein-described techniques also provide a distinct technical effect in terms of enhanced computer performance and/or reduced processing times as compared to conventional approaches. Furthermore, in contrast to some conventional approaches that are multi-frequency approaches, the herein-described techniques may be based upon single frequency analysis, further simplifying and reducing the computational overhead associated with such techniques.

Figure 7:
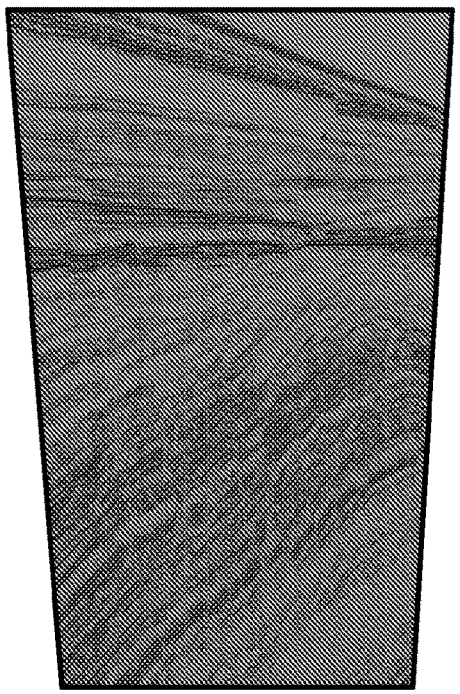

Now turning to FIGS. 7-20, these figures graphically illustrate the operations discussed above within the context of an example seismic data set, e.g., a vertical section taken through a three-dimensional seismic cube as illustrated at 450 in FIG. 7. It will be appreciated that the aforementioned analysis techniques may be performed independently on each trace in such a cube, as well as that these techniques are not limited to use with three-dimensional seismic.

Figure 8:
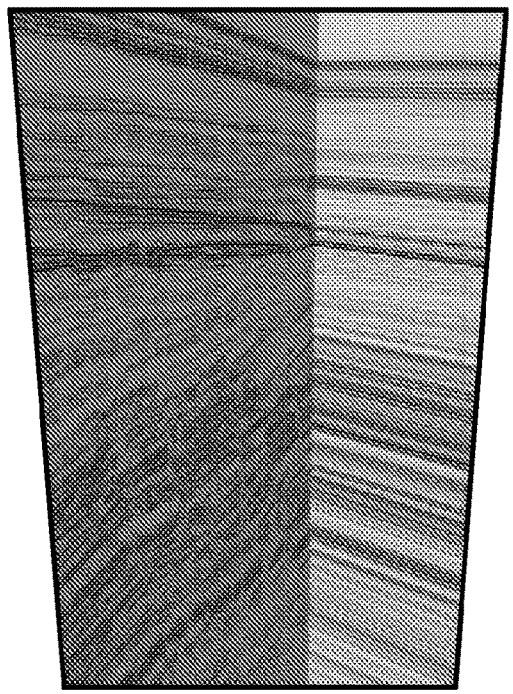

For the purposes of this example, analysis of a single seismic trace is performed over a frequency range of 1-125 Hz, with each spectral component representing a 1 Hz band, for a total of 125 spectral components generated from the seismic trace. FIG. 8 illustrates for the purposes of the example a graphical depiction 460 in which a single trace is extracted and copied to create 125 copies of the trace running orthogonal to the vertical section of FIG. 7.

Figure 9:
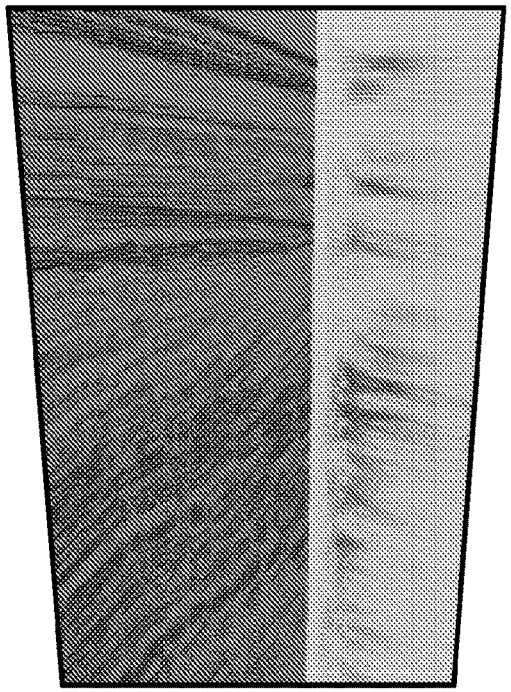
Figure 10:
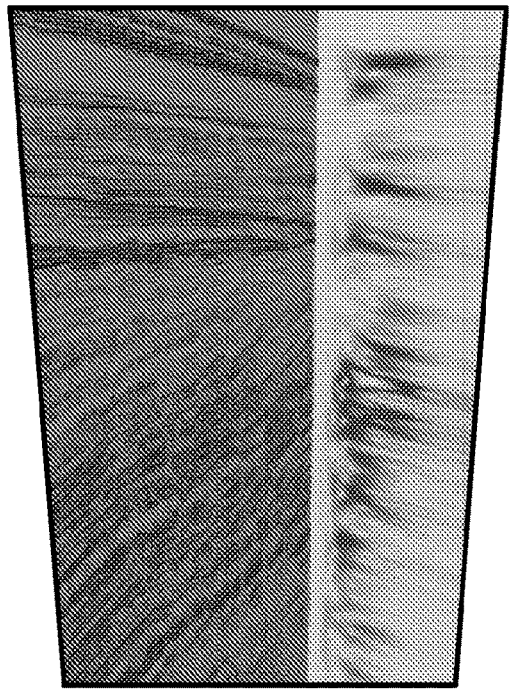

FIG. 9 next illustrates at 470 the splitting of the trace into 125 spectral components having respective associated frequencies of 1, 2, . . . , and 125 Hz, with each spectral component generated by applying to the corresponding copy of the trace a 1 Hz narrowband filter with a center frequency matching the associated frequency for the spectral component. In the graphical depiction 470, the spectral components increase in associated frequency from left to right. FIG. 10 illustrates at 480 the corresponding amplitudes of the individual spectral components. Generally the lowest frequencies (to the left) and the highest frequencies (to the right) may be weak as compared to the amplitudes in the center of the spectrum. Thus, as will be appreciated, establishing spectral high's or low's without first doing a spectral balancing step may be difficult. Embodiments consistent with the invention, on the other hand, may avoid the difficulty and inefficiency of spectral balancing. Furthermore, as will be appreciated, the amplitude of each spectral component may be, in general, identical to the envelope (also referred to as reflection strength) of that spectral component.

Figure 11:
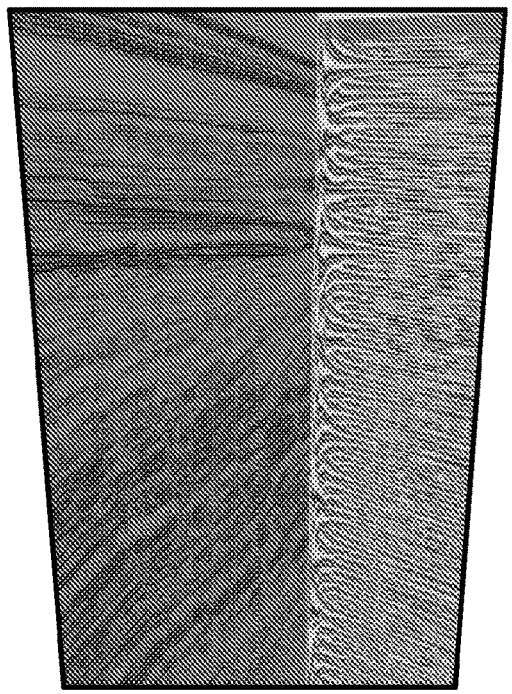
Figure 12:
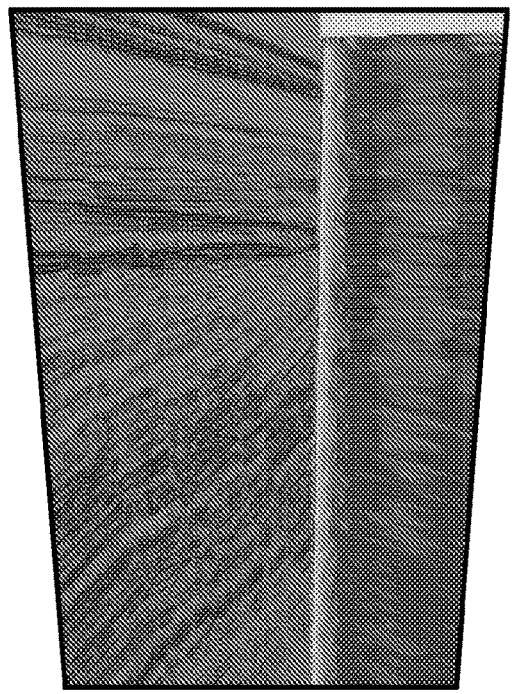

FIG. 11 next illustrates at 490 the instantaneous phase of each spectral component, where the value range is +/−180 degrees, while FIG. 12 illustrates at 500 the instantaneous frequency of each spectral component. As will be appreciated, the phase spectrum may be independent of the amplitude of the individual spectral components, which eliminates dependencies on spectral balancing processing. Further, as noted above, the instantaneous frequency is equal to (1/360) *dφ/dt(instantaneous phase), where the unit is Hz (i.e. oscillations per second). In addition, as noted above, the instantaneous phase may also be unwrapped prior to calculating the instantaneous frequency.

Figure 13:
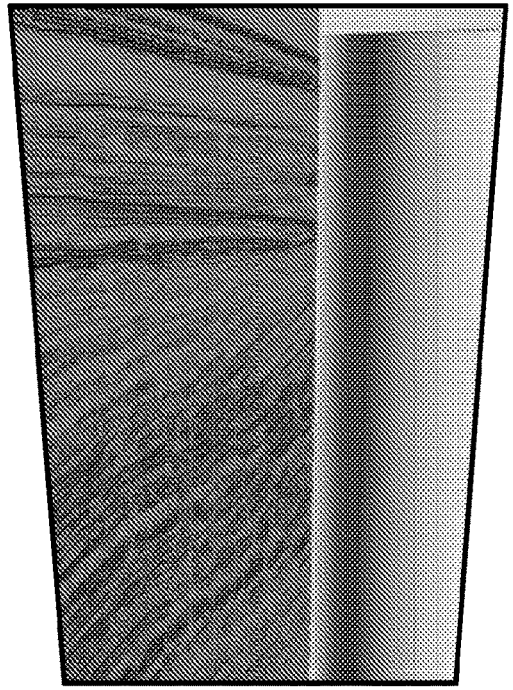

For the purposes of comparison, FIG. 13 illustrates at 510 the theoretically expected instantaneous phase for each spectral component, and generally the observed instantaneous frequency is expected to have the same profile in the absence of destructive interference. Thus, a comparison of graphical depictions 490 and 510 in FIGS. 11 and 13 illustrates the presence of destructive interference in the seismic trace.

Figure 14:
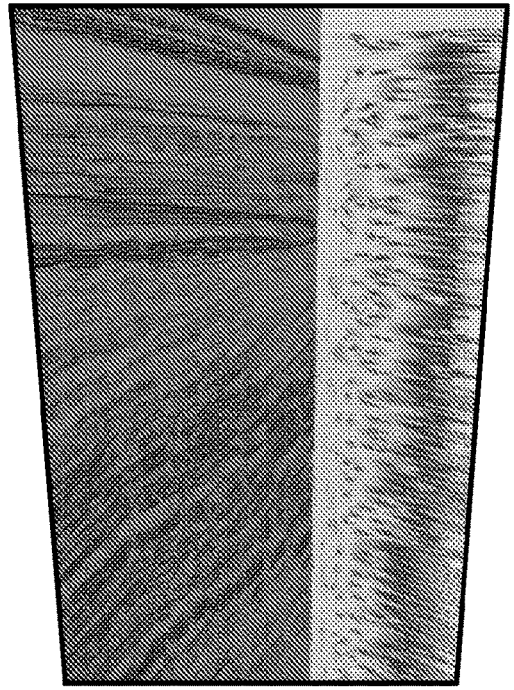

FIG. 14 next illustrates at 520 an absolute difference taken between observed instantaneous frequency and expected instantaneous frequency (i.e., the associated frequency for the spectral component), where the difference is proportional to the frequency of the individual spectral component. Thus, as illustrated at 530 in FIG. 15, it may be desirable in some embodiments to normalize the frequency differences for the spectral components using the associated frequencies for those spectral components (e.g., by dividing by F), and clip to the value range 0.0 . . . 1.0, such that a normalized frequency difference Di is determined. As also shown in FIG. 15, dots (e.g., dot 532) generally indicate destructive tuning at those points.

FIG. 16 next illustrates at 540 the results of applying the aforementioned analysis operations for all traces in the vertical section 450 of FIG. 7 and determining the maximum frequency differences for all of the samples of all of the spectral components of all of the traces in the vertical section. Graphical depiction 540 in particular illustrates determined instantaneous frequencies for each of the traces in the vertical section. Furthermore, in this graphical depiction, limit frequencies of 6 Hz and 60 Hz are applied prior to determining the maximum frequency differences. It will be appreciated from a review of this depiction that the estimated tuning frequency is generally laterally continuous, and may appear like individual layers in a vertically stacked sequence, and that the apparent layers are conformable with (i.e. honor the structural dips of) the input seismic data. FIG. 17 illustrates at 550 the corresponding estimated tuning thicknesses (calculated as 1/estimated tuning frequency).

Figure 18:
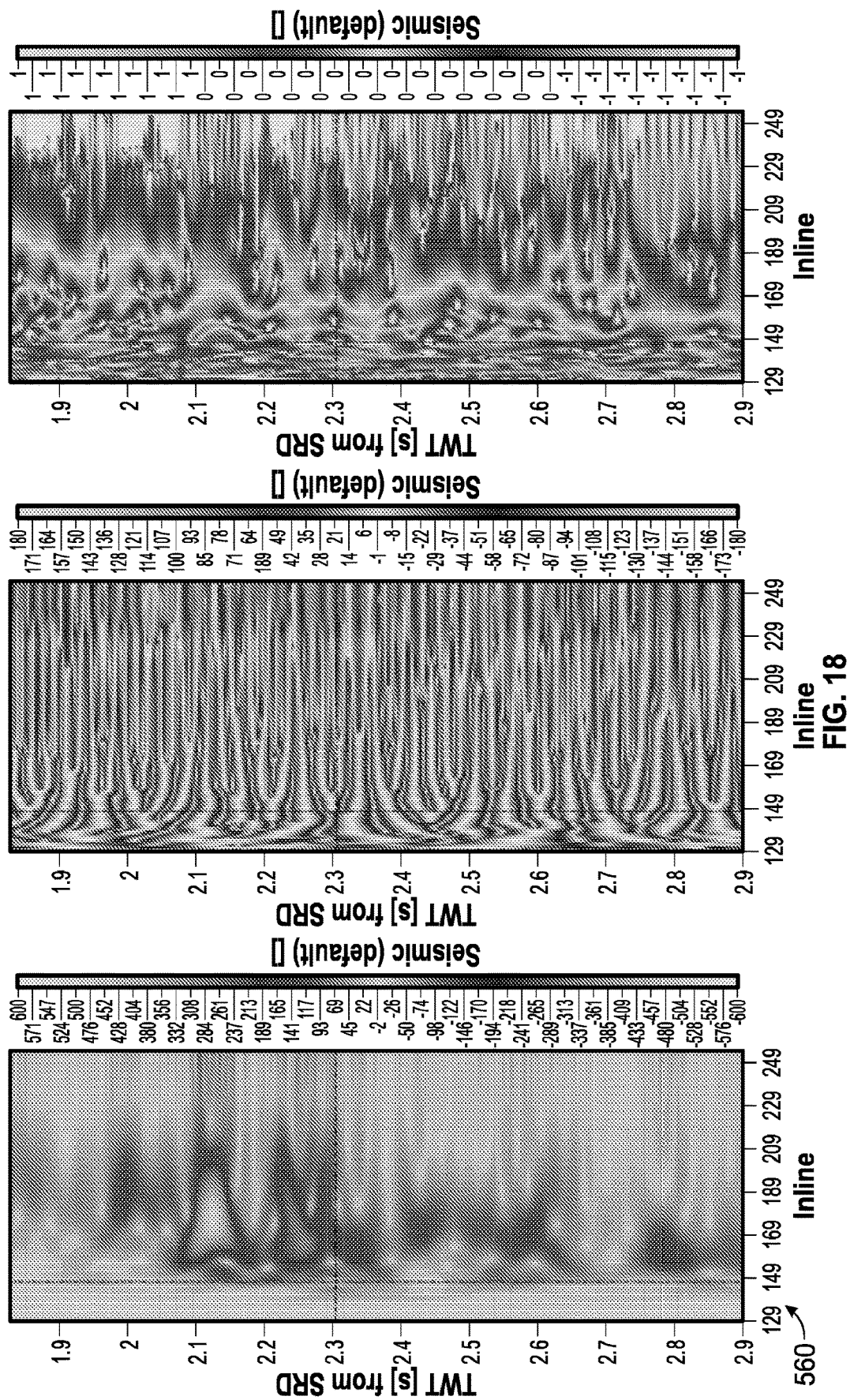

Now turning to FIG. 18, this figure illustrates at 560 a comparison between frequency-dependent spectral amplitude/envelope (left), spectral phase/instantaneous phase (center) and instantaneous frequency error/estimated tuning frequency (right). It will be appreciated that the high values of tuning frequency values generally correlate to "breaks" in the phase spectrum, and troughs (local minima) in the spectral amplitude to the left. In addition, it will be appreciated that more than one peak in the instantaneous frequency error plot for an individual sample may occur, and in some embodiments the frequency of the highest error-value sample, within the pre-defined frequency bounds, may be selected as the tuning frequency for that sample. In some embodiments, the first peak for each sample may be selected (as subsequent peaks may be due to harmonics). However, in some embodiments, a lowest frequency may be very close to a lower bound of the frequency scan, which may correspond to poor signal-to-noise ratio, such that the estimate may be unstable, and as such, in some embodiments it may be desirable to select the highest-value peak (at the risk of potentially picking an integer multiple of the true tuning frequency). Some embodiments may implement other types of peak-picking strategies, e.g. by counting the number of peaks for each sample, calculating the distance between peaks, etc, and with such measures make a selection of tuning frequency through statistical and/or physical reasoning.

Figure 19:
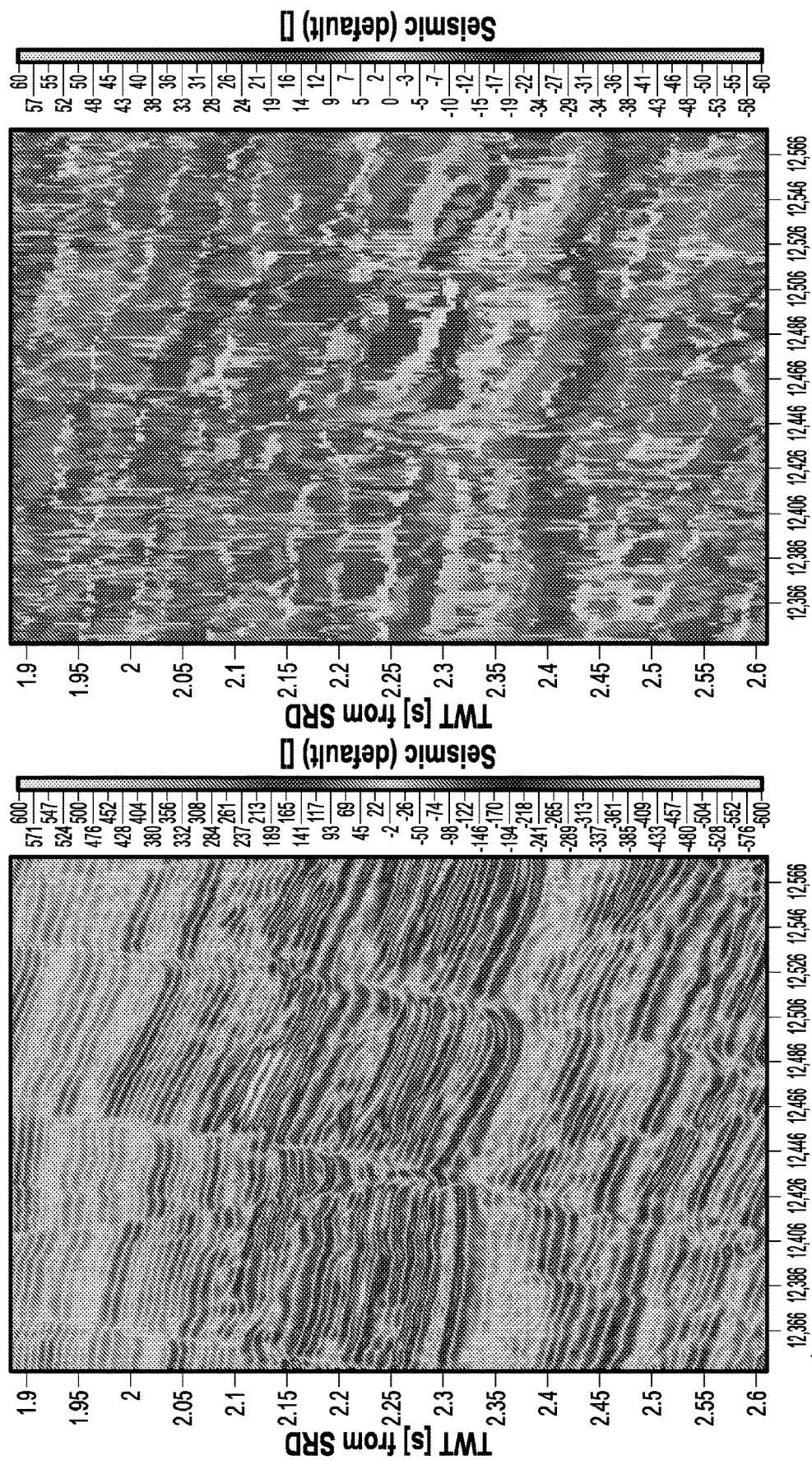

FIG. 19 next illustrates at 570 an enlarged view of a portion of the "tuning frequency" estimate of FIG. 18 (to the right) together with the corresponding portion of the input seismic data of FIG. 7 (to the left). As may be appreciated from a review of the graphical depiction, there are many reflectors in the seismic image that are not reflected in the "tuning frequency" image, in part because the "tuning frequency" image explicitly attempts to map out thin layers with equal, but opposite polarity, reflection coefficients. In many instances, such layers are sand bodies embedded between shale layers above and below, and potential locations of recoverable hydrocarbons.

Figure 20:
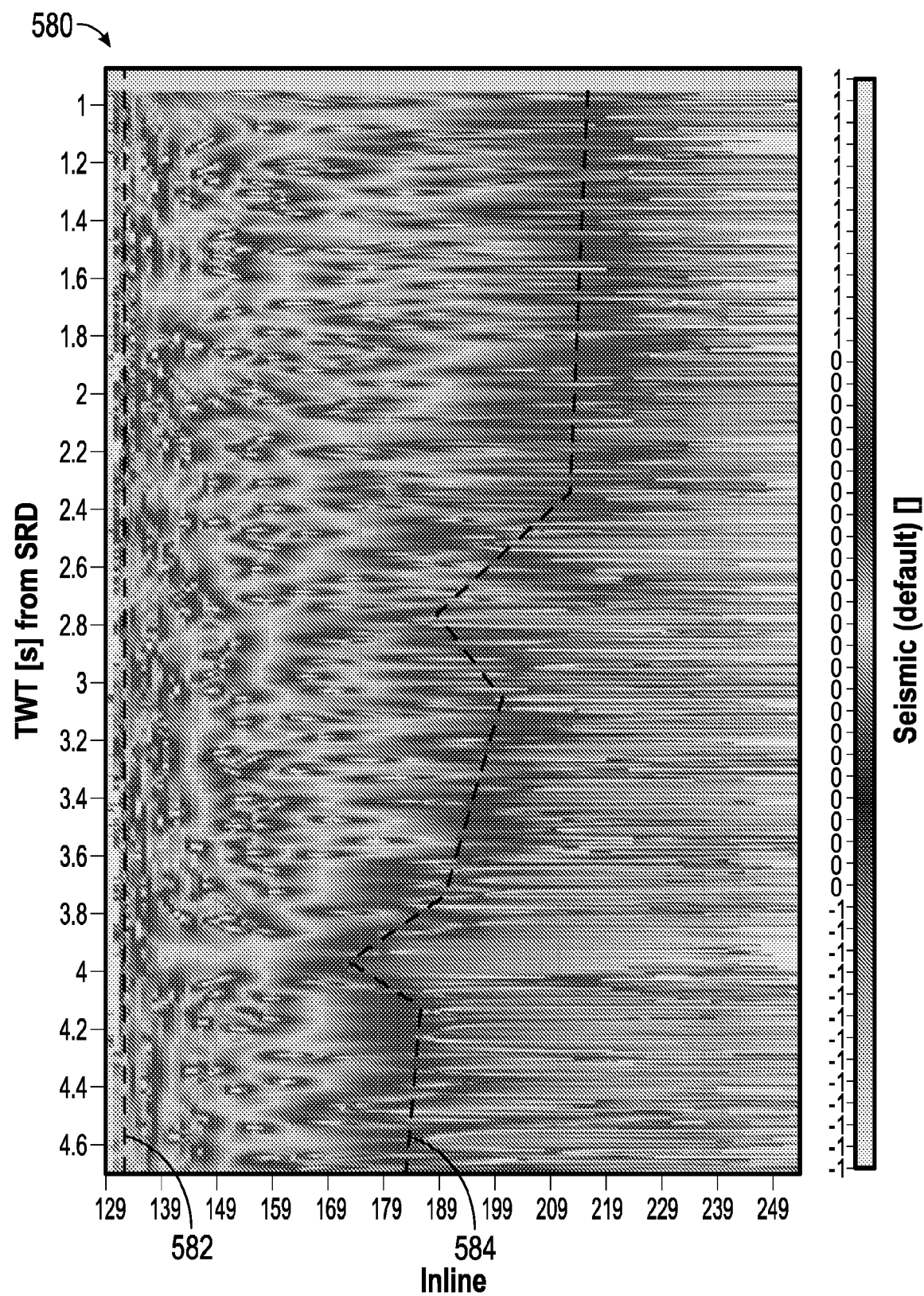

FIG. 20 next illustrates at 580 a time-varying frequency error for each spectral component (range 1-125 Hz, with step 1 Hz) in the example seismic trace used in the analysis above. The dashed lines 582, 584 generally indicate the extents of the time-varying seismic bandwidth. The seismic trace appears to have a stable signal down to approx. 6 Hz, and up to approx. 80 Hz in the shallow part of the section. At the bottom of the section the signal appears to be robust up to approx. 50 Hz. In some embodiments, as noted above, image processing may be implemented to identify the high and/or low frequency bounds, and static or depth/time-dependent limits may be set in some embodiments to limit the search of maximum frequency differences. For this example seismic trace, a static minimum frequency limit (e.g., 6 Hz) may be selected, while a time-dependent function may be used for the maximum frequency limit, e.g., a linear function that varies from 80 to 50 Hz from the minimum depth to the maximum depth represented in the depiction.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims.

It will also be appreciated that while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method for analyzing time-series data comprising, using at least one processor:
    splitting a time-series data set into a plurality of spectral components, each spectral component having an associated frequency;
    determining an instantaneous frequency for each spectral component among the plurality of spectral components;
    determining a frequency difference for each spectral component based at least in part on the associated and instantaneous frequencies therefor;
    determining a tuning parameter based at least in part on the determined frequency difference of each spectral component; and
    generating a model of a subsurface formation using at least the tuning parameter.

2. The method of claim 1, wherein the time-series data set comprises an individual seismic trace in a seismic data set obtained from the subsurface formation, wherein splitting the time-series data set into the plurality of spectral components includes splitting the individual seismic trace into the plurality of spectral components, and wherein determining the tuning parameter based at least in part on the determined frequency difference of each spectral component includes determining the tuning parameter for the individual seismic trace.

3. The method of claim 2, wherein the individual seismic trace is among a plurality of individual seismic traces in the seismic data set obtained from the subsurface formation, the method further comprising:
    splitting each of the plurality of individual seismic traces into a plurality of spectral components, each spectral component having an associated frequency;
    determining an instantaneous frequency for each spectral component among the plurality of spectral components for each of the plurality of individual seismic traces;
    determining a frequency difference for each spectral component for each of the plurality of individual seismic traces based at least in part on the associated and instantaneous frequencies therefor; and
    determining a plurality of tuning parameters for the seismic data set based at least in part on the determined frequency difference of each spectral component for each of the plurality of individual seismic traces.

4. The method of claim 2, wherein the tuning parameter is tuning frequency or tuning thickness.

5. The method of claim 2, further comprising determining a maximum frequency difference spectral component for each of a plurality of samples of the individual seismic trace.

6. The method of claim 5, wherein determining the tuning parameter includes, for each of the plurality of samples, determining a tuning frequency as the associated frequency for the maximum frequency difference spectral component determined for that sample.

7. The method of claim 5, further comprising determining a minimum limit frequency and/or a maximum limit frequency for the individual seismic trace based at least in part on the frequency difference of each spectral component for the individual seismic trace.

8. The method of claim 7, wherein determining the maximum frequency difference spectral component for each of the plurality of samples of the individual seismic trace includes filtering out spectral components having associated frequencies outside of the determined minimum limit frequency and/or maximum limit frequency.

9. The method of claim 7, wherein the determined minimum limit frequency and/or maximum limit frequency includes a static limit frequency.

10. The method of claim 7, wherein the determined minimum limit frequency and/or maximum limit frequency includes a time or depth-varying limit frequency.

11. The method of claim 6, further comprising determining a tuning thickness for each of the plurality of samples from the determined tuning frequency therefor.

12. The method of claim 11, wherein the determined tuning thickness represents a thickness of a thin-bed structure in the subsurface formation.

13. The method of claim 2, further comprising performing an oilfield operation using the determined tuning parameter.

14. The method of claim 1, wherein splitting the time-series data set into the plurality of spectral components comprises applying a narrowband filter having the associated frequency for each of the plurality of spectral components to the time-series data set.

15. The method of claim 14, wherein the narrowband filter includes a short-time Fourier transform, a Stockwell transform, or a Continuous Wavelet Transform (CWT) filter.

16. The method of claim 1, wherein determining the instantaneous frequency for each spectral component among the plurality of spectral components includes determining a derivative of the instantaneous phase for each spectral component among the plurality of spectral components.

17. The method of claim 1, wherein determining the frequency difference for each spectral component based at least in part on the associated and instantaneous frequencies therefor includes normalizing the determined frequency difference.

18. A program product, comprising:
a non-transitory computer readable medium; and
program code stored on the non-transitory computer readable medium and configured upon execution by at least one processor to analyze seismic data by:
  receiving seismic data comprising one or more individual traces;
  splitting each individual trace into a plurality of spectral components;
  for each individual trace, determining an instantaneous frequency for each spectral component of the plurality of spectral components;
  for each spectral component of each individual trace, determining a frequency difference for the spectral component based on an associated frequency of the spectral component and the determined instantaneous frequency for the spectral component;
  determining a tuning parameter for the seismic data based at least in part on the determined frequency difference for each spectral component; and
  generating a model of a subsurface formation using at least the tuning parameter.

19. The method of claim 1, wherein generating the model of the subsurface formation is independent of a spectral balancing process.

20. The method of claim 1, further comprising applying image processing to identify one or more frequency bounds.

* * * * *